Oct. 13, 1970 — L. RAMOS — 3,533,126
CLEANING PAD
Filed July 16, 1968
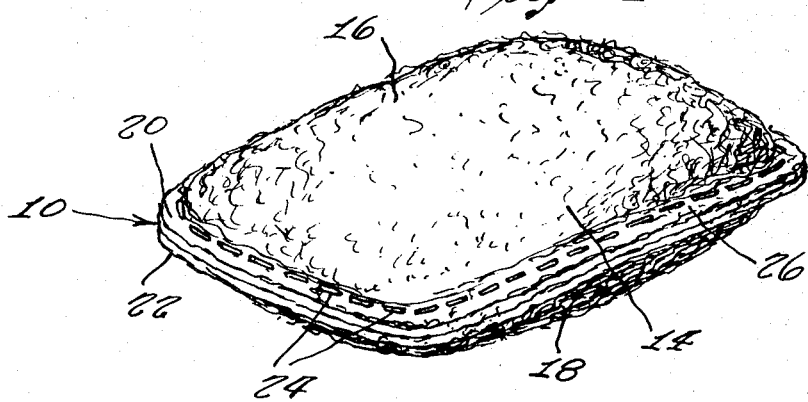
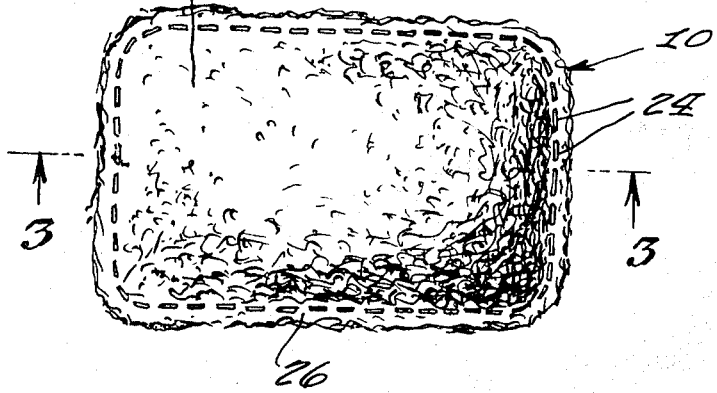
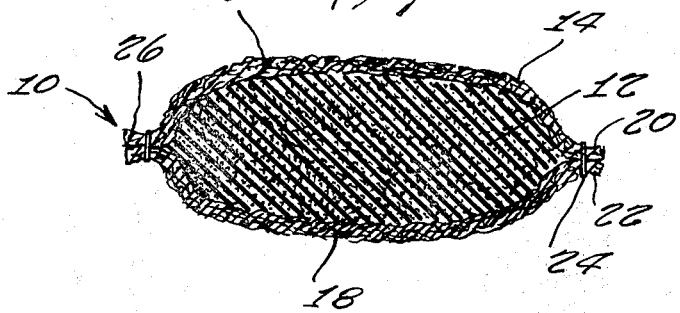
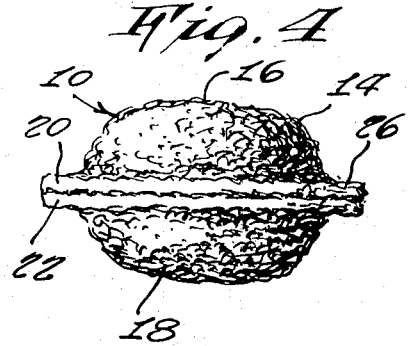
INVENTOR
LEON RAMOS
BY
Carl Miller
ATTORNEY United States Patent Office 3,533,126
Patented Oct. 13, 1970

3,533,126
CLEANING PAD
Leon Ramos, 27 Wyckoff St., Brooklyn, N.Y. 11201
Filed July 16, 1968, Ser. No. 745,207
Int. Cl. A41l *13/16*
U.S. Cl. 15—209                                    1 Claim

ABSTRACT OF THE DISCLOSURE

A cleaning pad consisting of a sponge rubber core encased within an outer covering of scouring material made of nylon. The covering of scouring material made of nylon is formed of an upper layer and lower layer respectively covering and extending beyond the upper and lower sides of the sponge rubber core with the overlapping edge portions of the two layers secured together entirely around the perimeter of the sponge rubber core by suitable stitching.

---

This invention relates to a cleaning pad and has for its primary object the provision of a pad having a sponge rubber core completely contained within a covering layer of scouring material made of nylon.

Another object of this invention is to provide the sponge rubber core with upper and lower layers of scouring material made of nylon that extend beyond the side edges of the sponge rubber core and secured in contacting engagement by suitable stitching.

A further object of this invention is to provide a combination cleaning pad of sponge rubber encased in a covering of scouring material made of nylon that in use will insure a fast cleaning action with instant removal of dirt, that is easy to handle and dependable, of long life, efficient and safe in operation as it will not scratch or mar the surface of the object to be cleaned such as bathtubs, sinks, basins, pots, pans, etc.; and which is simple to manufacture and of low cost.

FIG. 1 is a perspective view of the cleaning pad.
FIG. 2 is a plan view of the cleaning pad.
FIG. 3 is a longitudinal sectional view of the cleaning pad taken on line 3—3, FIG 2.
FIG 4 is an elevational end view of the cleaning pad.

Referring in detail to the drawing, the cleaning pad indicated generally by the reference numeral 10 is seen to consist, see FIG. 3 of a core of sponge rubber 12 and an outer covering 14 of scouring material made of nylon. The sponge rubber core 12 initially is a rectangular block of sponge rubber, shown such for purposes of illustration only, as the same may be circular, ellipsoidal or any other desired shape. The sponge rubber core 12 is of a length, width and thickness and of a size such as to be easily held in the hand.

The covering 14 of scouring material made of nylon consists of two matted layers of scouring material made of nylon 16 and 18, the term "matted" implying that the layers 16, 18 are each made up of a tangled thick mass of nylon fibers, each layer of the same thickness and dimensioned such as to equally extend beyond the sides of the rectangular sponge rubber core 12. The extended edge portions 20, 22 respectively of the layers 16, 18 are brought into contacting engagement and secured together by suitable stitching 24 to provide a central perimetral rim or flange 26 around the entire extent of the pad 10. The securing together of the extended end portions 20, 22 of the covering layers 16, 18 will obviously compress the side edge portions of the sponge rubber core 12 which will assume the shape shown in FIG. 3 to provide a somewhat rounded edge. It is to be noted that the covering 14 is in direct contact with the entire exterior surface of the sponge rubber core 12, as seen in FIG. 3.

In use the sponge rubber core 12 can soak up water containing soap, detergent or other cleaning fluid which in combination with the scrubbing or scraping action effected by the scouring material made of nylon of cover layers 16, 18 will impart the desired cleaning action on the object to be cleaned.

The cleaning pad 10 is long lasting, will not come apart, is convenient, easy to handle and use and superior to the conventional form of pad now in use.

Having described my invention, what I claim as new and desire to secure by Letters Patent is:

1. A cleaning pad comprising:
   (a) a core of sponge rubber substantially in the shape of a rectangular block,
   (b) a covering for the sponge rubber core completely encasing and contacting the same consisting of,
      (a') an upper scouring matted layer of nylon,
      (b') a lower scouring matted layer of nylon,
      (c') both layers being of like dimensions in positive direct contact with the upper and lower sides of the sponge rubber core and extending beyond each of the sides thereof,
   (c) the extended portions of the upper and lower covering layers being in abutting engagement in a transverse medial plane of the sponge rubber core parallel to the top and bottom sides thereof, and
   (d) stitching securing the abutting extended portions of the covering layers,
   whereby
   the edge side portions of the sponge rubber core are compressed to a substantially rounded edge.

References Cited

UNITED STATES PATENTS

| 720,890 | 2/1903 | Campbell. | |
|---|---|---|---|
| 1,905,163 | 4/1933 | Farqukar. | |
| 2,026,638 | 1/1936 | Kingman. | |
| 2,152,697 | 4/1939 | Kingman. | |
| 2,942,285 | 6/1960 | Gray | 15—209 |
| 2,958,885 | 11/1960 | Donney. | |
| 3,252,176 | 5/1966 | Gropper | 15—209 |

WALTER A. SCHEEL, Primary Examiner

LEON G. MACHLIN, Assistant Examiner